United States Patent
Lefers et al.

(10) Patent No.: US 11,638,403 B2
(45) Date of Patent: May 2, 2023

(54) SALT AEROSOL REMOVAL AND IRRIGATION WATER COOLING SYSTEM

(71) Applicant: KING ABDULLAH UNIVERSITY OF SCIENCE AND TECHNOLOGY, Thuwal (SA)

(72) Inventors: Ryan Michael Lefers, Thuwal (SA); Mark Alfred Tester, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 1 day.

(21) Appl. No.: 17/263,297

(22) PCT Filed: Apr. 24, 2019

(86) PCT No.: PCT/IB2019/053398
§ 371 (c)(1),
(2) Date: Jan. 26, 2021

(87) PCT Pub. No.: WO2020/026039
PCT Pub. Date: Feb. 6, 2020

(65) Prior Publication Data
US 2021/0144931 A1 May 20, 2021

Related U.S. Application Data

(60) Provisional application No. 62/711,896, filed on Jul. 30, 2018.

(51) Int. Cl.
*A01G 9/24* (2006.01)
*C02F 1/00* (2023.01)
(Continued)

(52) U.S. Cl.
CPC ............. *A01G 9/246* (2013.01); *A01G 9/247* (2013.01); *C02F 1/001* (2013.01); *C02F 1/04* (2013.01);
(Continued)

(58) Field of Classification Search
CPC .......... A01G 9/246; A01G 9/247; A01G 9/14; F24F 6/04; F24F 6/00; Y02A 40/25
(Continued)

(56) References Cited

U.S. PATENT DOCUMENTS 5,226,935 A * 7/1993 Wolff ........................ F24F 6/04
96/240
2004/0226448 A1* 11/2004 Griffiths .................... B03C 3/14
96/99

(Continued)

FOREIGN PATENT DOCUMENTS

| AU | 2010224409 A1 * | 10/2011 |
| EP | 0005103 B1 | 9/1981 |
| EP | 0517432 A1 | 12/1992 |

OTHER PUBLICATIONS

Fazlil Ilahi, W.F., et al., "Effects of Root Zone Cooling on Butterhead Lettuce Grown in Tropical Conditions in a Coir-Perlite Mixture," Horticulture, Environment, and Biotechnology, Feb. 10, 2017, vol. 58, No. 1, pp. 1-4, Springer.
(Continued)

*Primary Examiner* — Peter M Poon
*Assistant Examiner* — Jeffrey R Larsen
(74) *Attorney, Agent, or Firm* — Patent Portfolio Builders PLLC (57) ABSTRACT

A water cooling and salt aerosols removal system for cooling roots of a plant includes a salt water module configured to cool a salt water and to remove salt aerosols from an air stream, and a fresh water module configured to
(Continued)

further remove salt aerosols from the air stream by using fresh water. The air stream exits the salt water module and enters the fresh water module, and wherein the salt water has a higher content of salt than the fresh water.

20 Claims, 10 Drawing Sheets (51) Int. Cl.
    *C02F 1/04*     (2023.01)
    *F24F 6/04*     (2006.01)
    *C02F 101/10*     (2006.01)

(52) U.S. Cl.
    CPC ............ *F24F 6/04* (2013.01); *C02F 2101/10* (2013.01); *F24F 2006/046* (2013.01)

(58) Field of Classification Search
    USPC .................................................. 47/58.1 R, 17
    See application file for complete search history.

(56) References Cited

U.S. PATENT DOCUMENTS

| | | | | |
|---|---|---|---|---|
| 2009/0293354 A1* | 12/2009 | Goldberg | ............... | A01G 27/02 200/341 |
| 2010/0281896 A1* | 11/2010 | Al Watban | ............... | F28D 5/00 62/291 |
| 2013/0146437 A1* | 6/2013 | Maurer | ................ | F28F 13/003 165/181 |
| 2013/0192131 A1* | 8/2013 | Abahusayn | .............. | A01G 9/14 47/17 |
| 2016/0129381 A1* | 5/2016 | Gao | ................... | B01D 39/1623 55/385.2 |
| 2017/0082370 A1 | 3/2017 | Strumenti et al. | | |

OTHER PUBLICATIONS

International Search Report in corresponding/related International Application No. PCT/IB2019/053398, dated Aug. 9, 2019.
Junge, C.E., et al., "On the Distribution of Sea Salt over the United States and its Removal by Precipitation," Tellus, May 1957, vol. 9, pp. 164-173, Taylor and Francis Group LLC.
Lefers, R., et al., "Liquid Desiccant Dehumidification and Regeneration Process to Meet Cooling and Freshwater Needs of Desert Greenhouses," Desalination and Water Treatment, May 10-14, 2015, vol. 57, pp. 23430-23442, Balaban Desalination Publications.
Lertsatitthanakorn, C., et al., "Field Experiments and Economic Evaluation of an Evaporative Cooling System in a Silkworm Rearing House," Biosystems Engineering, Jan. 30, 2006, Vo. 93, No. 2, pp. 213-219, Elsevier Ltd.
Malli, A., et al., "Investigating the Performance of Cellulosic Evaporative Cooling Pads," Energy Conversion and Management, Mar. 24, 2011, vol. 52, pp. 2598-2603, Elsevier Ltd.
Paton, A.C., et al., "The Seawater Greenhouse for Arid Lands," Paper presented at: Mediterranean Conference on Renewable Energy Sources for Water Production (Santorini, Greece), Jun. 10-12, 1996, pp. 163-166.
Written Opinion of the International Searching Authority in corresponding/related International Application No. PCT/IB2019/053398, dated Aug. 9, 2019.
First Substantive Examination Report in corresponding/related Saudi Arabian Application No. 521421144, dated Sep. 17, 2022.

* cited by examiner

SALT AEROSOL REMOVAL AND IRRIGATION WATER COOLING SYSTEM

CROSS-REFERENCE TO RELATED APPLICATIONS

This application is a U.S. National Stage Application of International Application No. PCT/IB2019/053398, filed on Apr. 24, 2019, which claims priority to U.S. Provisional Patent Application No. 62/711,896, filed on Jul. 30, 2018, entitled "SALT AEROSOL REMOVAL SYSTEM AND IRRIGATION WATER COOLING FOR EVAPORATIVE COOLING SYSTEMS UTILIZING SALT WATER," the disclosures of which are incorporated herein by reference in their entirety.

BACKGROUND

Technical Field

Embodiments of the subject matter disclosed herein generally relate to removing salt aerosol, and more specifically, to a system that is configured to remove salt aerosol for an evaporative cooling system and to cool water for irrigating plants.

Discussion of the Background

Pad and fan evaporative cooling systems are commonly used to provide cooling and humidification of air for indoor horticulture and livestock growing environments, including in greenhouses, warehouses, barns, and vertical farming systems. (Lertsatitthanakorn et al., 2006; Malli et al., 2011) The pad and fan evaporative cooling systems range in size from small to large-scale industrial in nature. Of special interest is the controlled environment agriculture market, including for horticulture (plants) and livestock (fish, chickens, sheep, cattle, etc.). The same pad and fan evaporative cooling system may also be used to cool the irrigation water, to cool the roots of the plants, which is a technology used to improve harvest quality and quantity, and is by nature limited to plant production. (Fazlil Ilahi et al., 2017)

Various technologies exist on the market for cooling the air and/or water, but all these technologies uses a large amount of fresh water as the evaporative cooling is widely used with fresh water. However, the use of fresh water in the evaporative cooling process consumes significant amounts of fresh water, especially in the agriculture context, where as much as 80-90% of the total fresh water use of a greenhouse may be from the evaporative cooler (Lefers et al., 2016). This is especially concerning in dry, desertic areas where fresh water resources are already limited. Where available, fresh water in the evaporative cooler may be replaced by salt water (see respective websites for Seawater Greenhouse, Sundrop Farms and Sahara Forest Project as commercial examples). Replacing fresh water with salt water, especially sea water and brackish ground water, may save significant amounts of fresh water from being lost to the atmosphere as humidity. However, the use of salt water in the evaporative cooler leads to the development of salt aerosols. These aerosols are blown into the indoor environment, where they increase the risk of the metals parts rusting and also may injure plants as the salt aerosols condense onto their surfaces.

Thus, there is a need for a system and technology that allows the use of salt water in the evaporative cooling systems, but also removes the negative influence of the salt aerosols and cools irrigation water.

SUMMARY

According to an embodiment, there is a water cooling and salt aerosols removal system for cooling roots of a plant, and the system includes a salt water module configured to cool a salt water and to remove salt aerosols from an air stream and a fresh water module configured to further remove salt aerosols from the air stream by using fresh water. The air stream exits the salt water module and enters the fresh water module, and the salt water has a higher content of salt than the fresh water.

According to another embodiment, there is an air cooling and salt aerosols removing system that includes an air cooling system configured to cool an incoming air stream AA and generate a cooled air stream AB, a water cooling and salt aerosols removing system configured to receive the cooled air stream AB, cool water stored by the water cooling and salt aerosols removing system and remove salt aerosols from the cooled air stream AB, and a piping system connected to the water cooling and salt aerosols removing system, and configured to discharge the cooled air stream AB into an enclosure and the cooled water to roots of a plant in the enclosure.

According to still another embodiment, there is a method for cooling water and removing salt aerosols and the method includes cooling an incoming air stream AA and generating a cooled air stream AB; cooling salt water and fresh water with the cooled air stream AB; removing salt aerosols generated by the salt water, and using the cooled fresh water to irrigate a plant.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a water cooling and salt aerosols removal system. However, the system may be used not only to remove salt aerosols, but other aerosols too.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a water cooling and salt aerosol removal system that combines low-fresh water and low-energy technologies to save even more fresh water, protect a cooled environment from salt aerosols, make maximum use of scarce resources, and save electric power. According to this embodiment, the water cooling and salt aerosols removal system is different from the existing technologies in that it removes salt aerosols from a salt water based (or brackish water or a brine that includes salt or other chemical element) evaporative cooling system and provides cooling of irrigation water, all in one system. The term salt aerosols is defined in this application to mean one or more salt molecules that are airborne, for example, due to a turbulence associated with an air stream passing through the salt water. However, other mechanisms in addition or instead of the turbulence may be responsible for the salt aerosols generation.

Figure 1A:
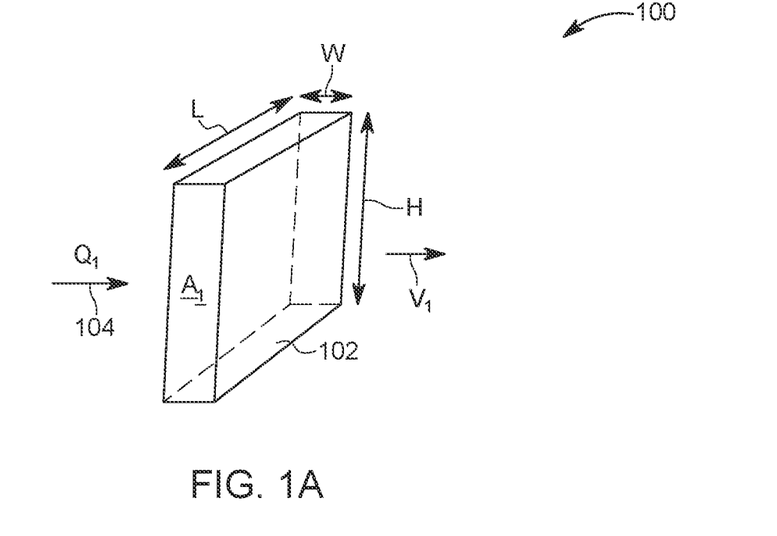
FIG. 1A illustrates an evaporative pad and FIG. 1B shows an oversized evaporative pad.
Figure 1B:
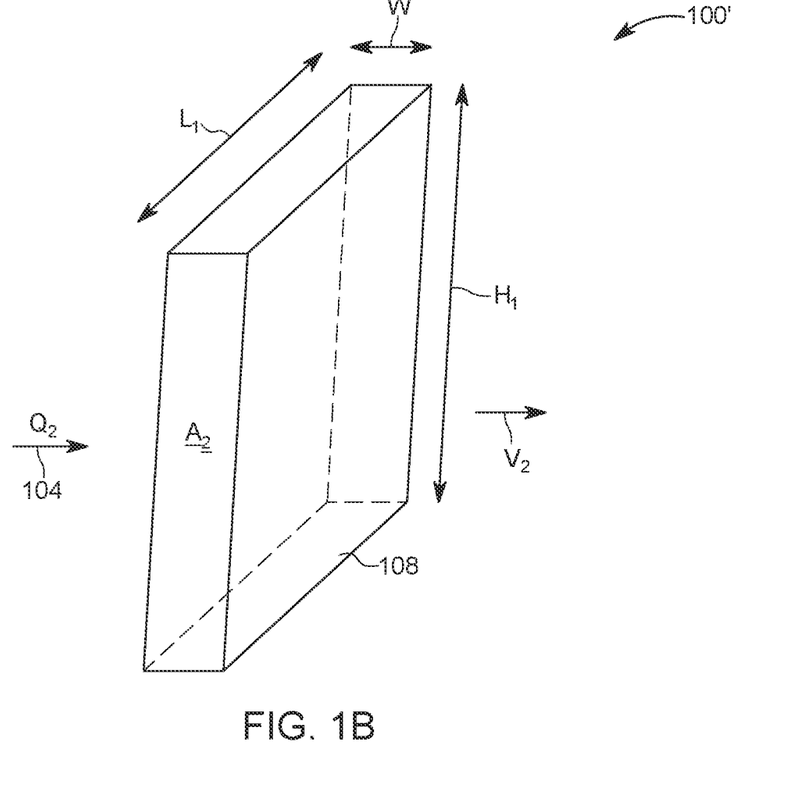

Before discussing such an integrated system, various salt aerosol removal modules are discussed. FIG. 1A shows a pad system 100 that has a pad 102 made of a porous material. The pad 102 has many channels that promote the movement of an incoming air stream 104 through it. For example, the pad may include, but is not limited to, hollow fiber membranes, flat sheet membranes, packed media beds, etc. The pad has a given length L, width W, and height H. Salt aerosols are formed in a pad and fan cooling system that utilizes salt water for evaporative cooling, due to the turbulence in the evaporative pad. Thus, according to this embodiment, by reducing the air speed of the incoming air stream 104 through the pad is likely to reduce the turbulence in the pad, and thus, the amount of salt aerosols. To achieve this, as illustrated in FIG. 1B, the pad sizes are increased to L1 and H1 while the air flow Q is maintained constant, which results in the air flow 104's reduced velocity. In this regard, note that the air flow Q1 for the pad 102 is equal to the area A1 which is crossed by the air flow, times the speed v1 of the air flow, while for the pad 108, the air flow Q2 is equal to the increased area A2 times the speed v2 of the air flow. Because the air flow is the same in both cases, i.e., Q1=Q2, and because A2>A1, it follows that v1>v2, i.e., the speed of the air flow for the pad 108 is smaller. A smaller speed results in less turbulence, and thus, less salt aerosols.

Therefore, with the pad system 100' of FIG. 1B, there is less risk of salts being transferred to the cooled environment downstream the pad. This increased pad may be used by itself or in combination with other salt aerosol removal modules described herein.

Figure 2A:
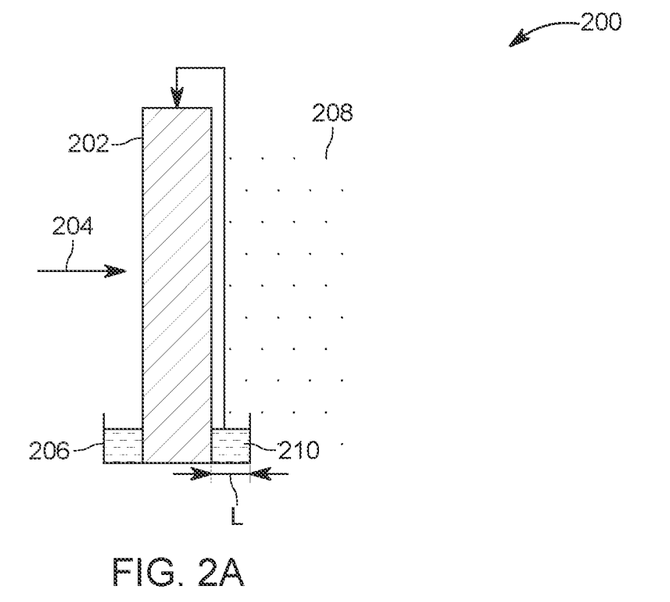
FIG. 2A shows an evaporative cooling system and FIG. 2B shows an evaporative cooling system with an oversized container for capturing falling salt aerosols.
Figure 2B:
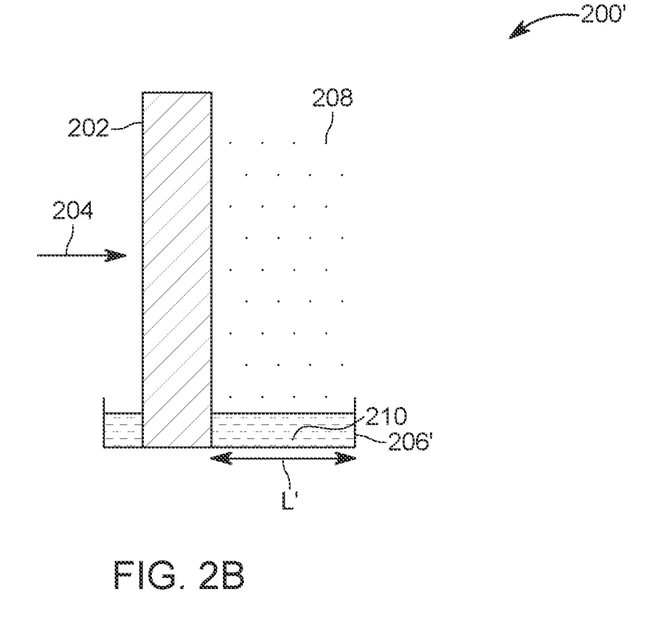

Another salt aerosol removal module is shown in FIGS. 2A and 2B and uses gravity to remove the salt aerosols. System 200 includes a pad 202, similar to pad 102 discussed in the previous embodiment, which is partially placed inside a container 206. An air stream 204 passes through the pad 202 and due to the various factors responsible for the turbulence, salt aerosols 208 are formed after the air stream passes the pad. Note that container 206 holds salt water 210, which is provided to the top of the pad for cooling down the incoming air stream 204. However, the system 200 has the container 206 sized (having a length L behind the pad 202) to mainly fit the pad 202, and thus, the salt aerosols 208 are allowed to move freely through the system, which is damaging for the environment controlled by the evaporative cooling system.

Contrary to this, the system 200' shown in FIG. 2B has the container 206' oversized, to extend behind the pad 202 with a certain length L', larger than the length L, so that the salt aerosols 208 formed behind the pad 202 fall into the container 206' due to the gravity. In this regard, depending on the speed v of the incoming air stream 204, and the weight of the salt aerosols, it is possible to calculate the length L' to capture most of, if not all, the formed salt aerosols. In this way, the salt aerosols are not only prevented from being transferred into a sensitive indoor environment, but can also be recycled as part of the liquid in the evaporative cooler system. As for the previous module, the present module may be used with other modules for removing the salt aerosols.

Figure 3A:
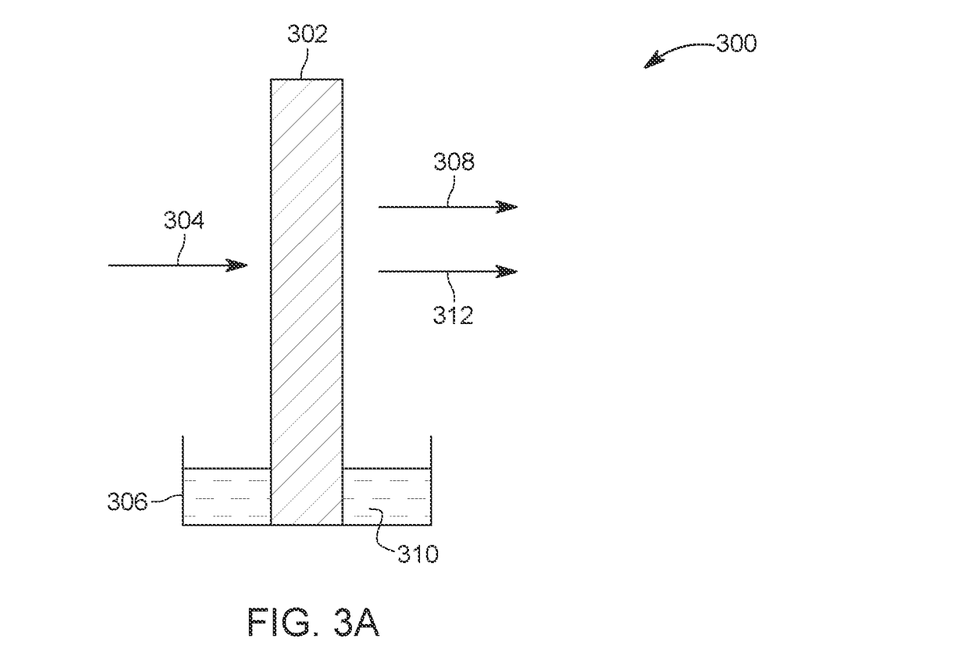
FIG. 3A shows an evaporative cooling system and FIG. 3B shows an evaporative cooling system with a screen for removing salt aerosols.
Figure 3B:
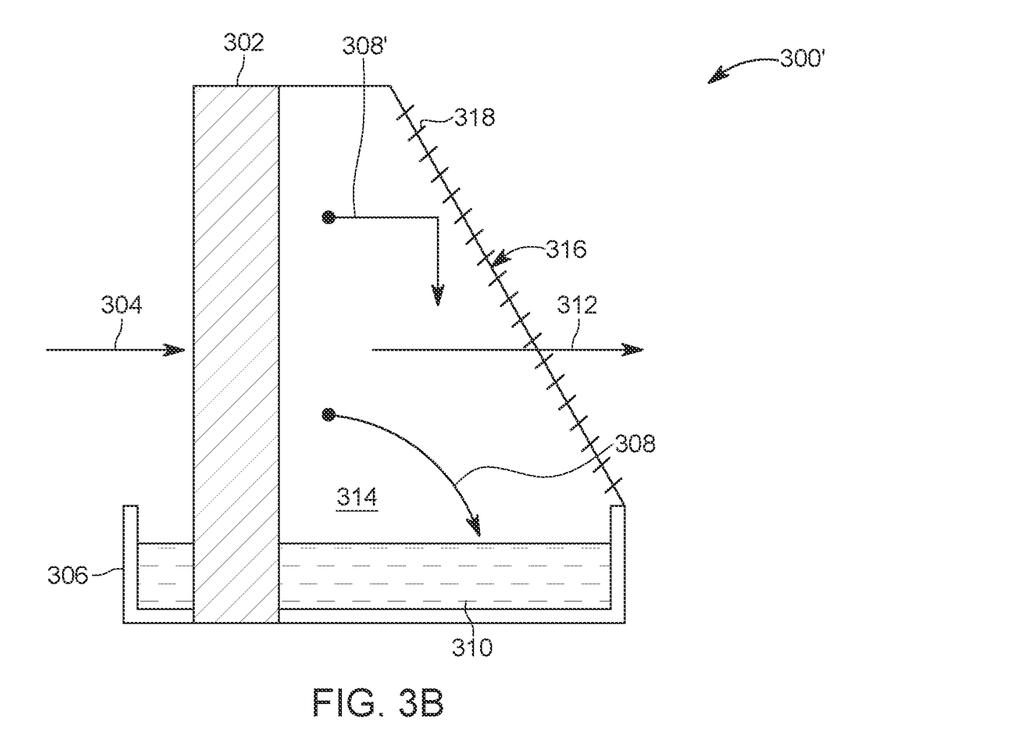

Still another salt aerosol removal module is discussed with regard to FIGS. 3A and 3B and this module uses the phenomena of impaction for removing the salt aerosols. FIG. 3A shows a system 300 in which a pad 302 is placed in a container 306 that may hold salt water 310. An incoming air stream 304 passes through the pad 302, which cools the air forming a cooled outgoing air stream 312, but also generates the salt aerosols 308.

The system 300' shown in FIG. 3B has a closed chamber 314 that is defined by the pad 302, the container 306, the surface of the salt water 310, and a wall 316 connected to the pad 302 and the container 306. The wall 316 has at least a portion 318 that is a screen or filter placed at a non-zero angle relative to the vertical, such that the aerosols 308' will fall back into the container 306, due to the gravity, after impacting the filter 318. Note that the outgoing air stream 312 passes the screen 318 without being affected, as the size of the openings in the screen 318 are selected to be larger than the air particles, but smaller than the size of the salt aerosols. Adding a corrosion resistant mesh or screen 318 removes large or medium size aerosols that do not fall down into the container 306 due to gravity. In other words, some of the salt aerosols 308 fall naturally, due entirely to the gravity, back to container 306, as discussed above with regard to the embodiment shown in FIG. 2B, while other salt aerosols 308' would firstly interact with the screen 318 and then fall into the container 306. Likely screen materials for the screen 318 may include, but are not limited to, plastic, nylon, or similarly non-corrosive materials.

Figure 4:
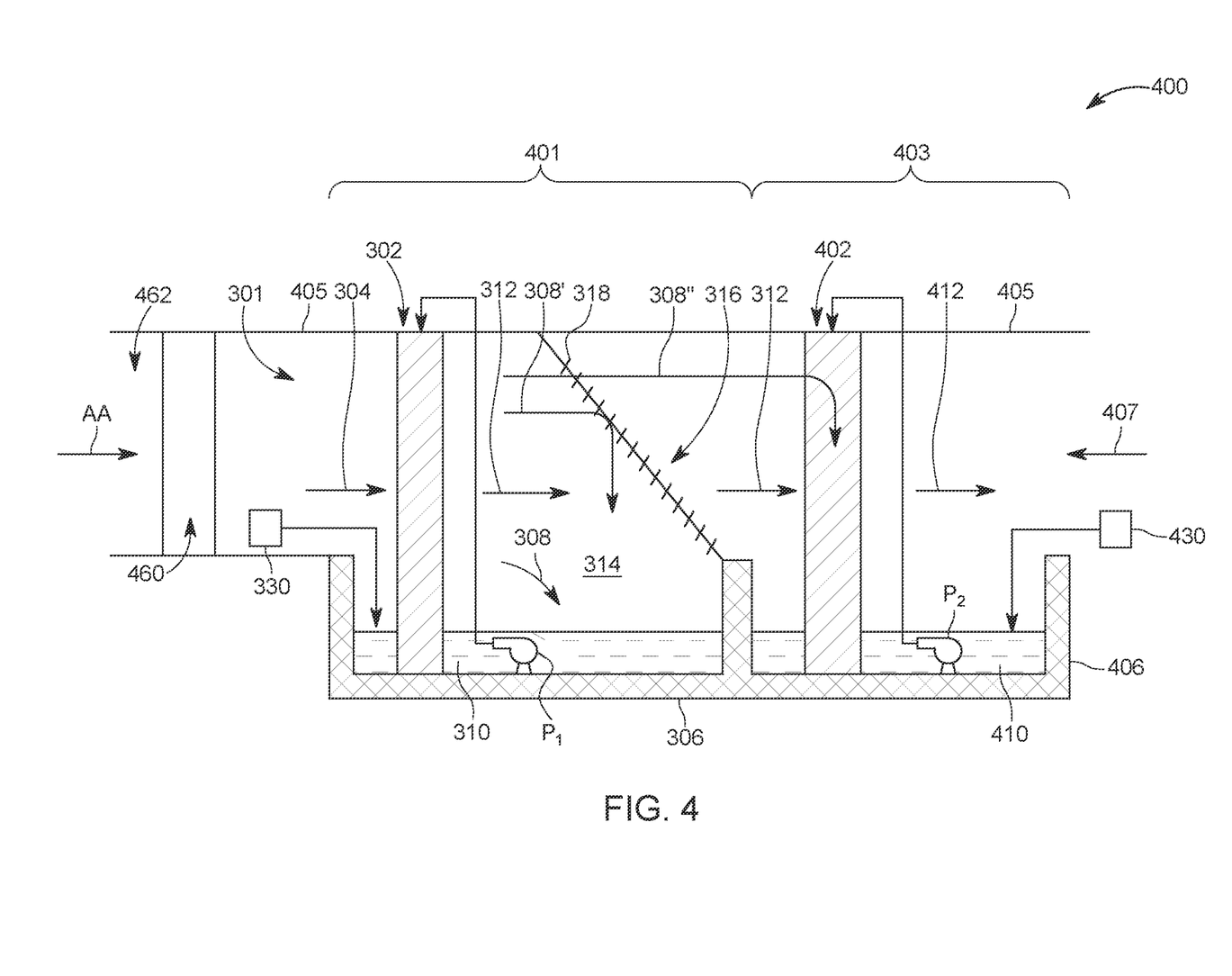
FIG. 4 shows a water cooling and salt aerosols removal system.

A fourth salt aerosol removal module is discussed with regard to FIG. 4 and this module uses a scrubbing process to further remove the salt aerosols from the incoming air stream. More specifically, a water cooling and salt aerosols removing system 400 includes a salt water module 401 and a fresh water module 403. The salt water module 401 includes a first container 306 that holds a pad 302, similar to the embodiment shown in FIG. 3B. The incoming air stream 304 passes through the pad 302 and some salt aerosols 308 fall due to the gravity directly into the pool of salt water 310 hold by the first container. Another part of the salt aerosols 308' impact the screen 318 and then fall into the first container 306. However, still another part of the salt aerosols 308" pass unaffected by the screen 318. These salt aerosols 308" enter the fresh water module 403, and they are scrubbed from the air stream 312, with a second pad 402, which is placed in a second container 406. Thus, the outgoing air stream 412 has almost no salt aerosols left.

Although FIG. 4 shows the first and second containers 306 and 406 being formed as a single structure, it is possible that the two containers are implemented independent from each other, i.e., as independent containers. Also note that the various air streams are directed through the system 400 within a housing 405, which has an inlet 462 and an outlet 407. The evaporative pads and the containers are placed in the housing 405 and the air streams are forced to move through the first and second evaporative pads as there is no other path for the air once it enters at the inlet 462. A control system and associate sensors that are used to control the system 400 are discussed later with regard to FIG. 5.

The smallest salt aerosols 308" are scrubbed in this embodiment with a second evaporative pad 402. Note that a pump P1 in the salt water module 401 circulates the salt water 310 to the top of the first evaporative pad 302 while a pump P2 in the fresh water module 403 circulates the fresh water 410 to the top of the second evaporative pad 402. By forcing the air stream with any remaining salt aerosols through the second evaporative cooling pad 402 operating with fresh water 410, the removal of salt water aerosols is achieved. Although the second evaporative cooling pad 402 uses fresh water 410, it is estimated that the total water consumption of this second evaporative pad will only be a fraction of the first pad, ~10-20%, with the total fraction depending upon the evaporative cooling efficiency of the salt water cooling pad. As the salt content naturally increases in this second system due to salt aerosol removal, at some point, the water 410 will have to be removed to keep the system classified as "fresh water" and to eliminate any potential for additional salt aerosol generation at the second pad 402, rather than fresh water aerosols, which are expected.

System 400 may also include a salt water source 330 of salt water for supplying the salt water to the first container and a fresh water source 430 of fresh water for supplying the fresh water to the second container. The salt water source may be ocean water, sea water, or waste water from a water purifying plant while the fresh water source may be a river, a well, or a city water supply system. Appropriate pumps and valves may be provided with these sources for pumping the salt/fresh water to the corresponding container. In one application, the incoming air stream 304 is first cooled with an air cooling system 460, which is located upstream the system 400. Thus, an air stream AA, for example, ambient air from outside the controlled enclosure, is first cooled with the air cooling system 460 and then this cooled air 304 is scrubbed of aerosols. The air cooling system 460 may be an evaporative system that may use fresh or salt water for the cooling process. In one application, the air cooling system 460 is placed at an inlet 462 of a housing that house both system 460 and system 400, as discussed later.

Therefore, the system 400 in this embodiment recycles the fresh water 410 from the second evaporative pad 402 in one of two ways: by recycling the fresh water 410 from the second pad 402 into the first container 306 of the first pad 302 when it is too salty to be considered as fresh water, and/or by using the water 410 for irrigation of the plants. This scrubbing system may also be used to cool the fresh water that is planned for use in an irrigation system, as described next.

In addition to removing the salt aerosols from the evaporative cooling system, the various embodiments discussed above may also provide water cooling for the irrigation water and/or root zone of the plants with which the system is associated. The plants experience relatively stable root temperatures in the soil, while air temperatures generally increase during the day and decrease at night. The embodiments to be discussed next propose to provide cooling for the irrigation water and therefore the root zone via one of the two following processes: (1) direct cooling for irrigation water, (2) indirect cooling for irrigation water, and/or (3) indirect cooling of the root zone.

Figure 5:
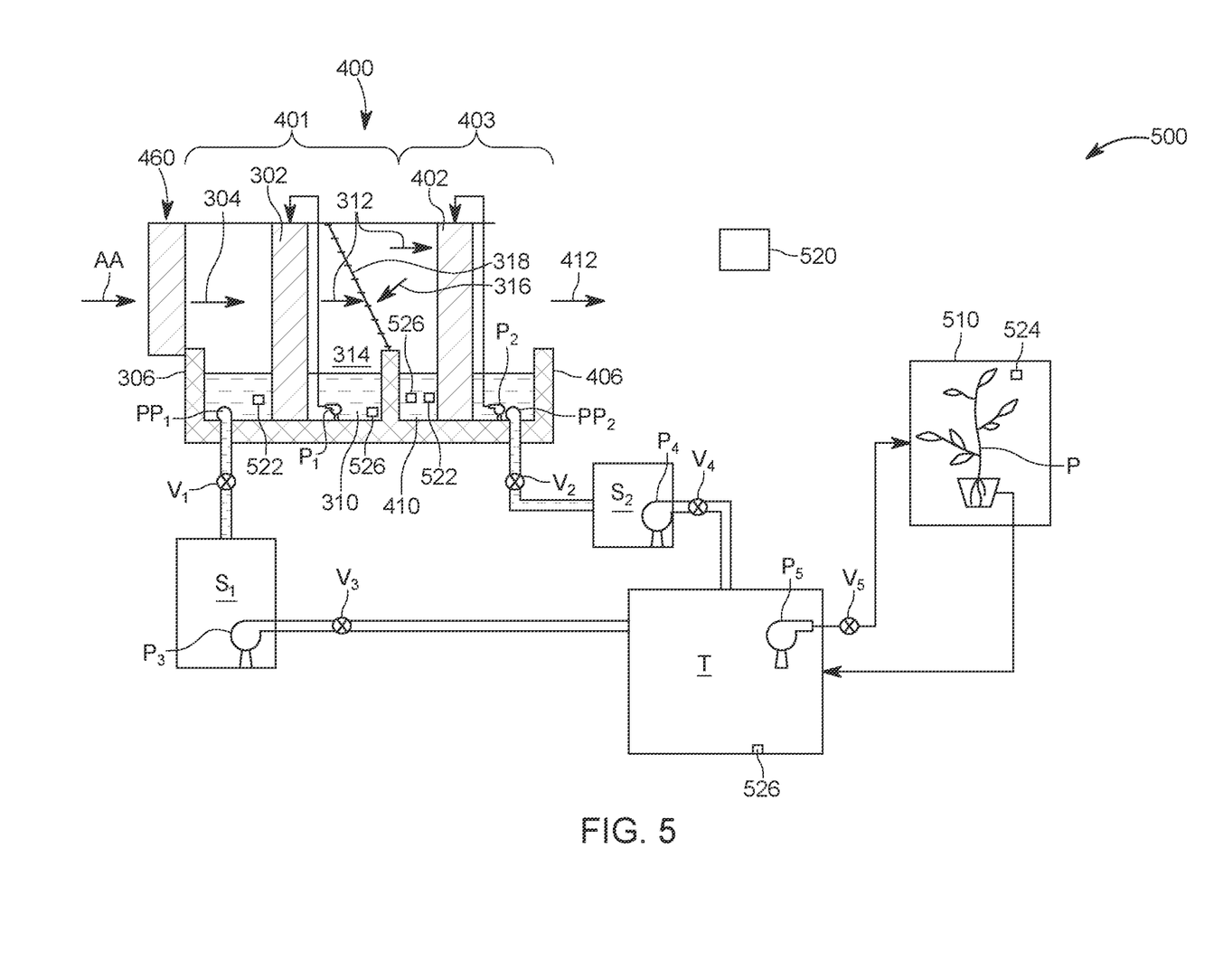
FIG. 5 shows a water cooling and salt aerosols removal system for directly cooling irrigation water.

As illustrated in FIG. 5, a direct cooling irrigation water and salt aerosols removal system 500 includes a salt aerosol removal module 400 (it is also possible to use one of the modules 100', 200', 300' or a combination of them) that is fluidly connected to a first storage tank S1 and a second storage tank S2. The first and second storage tanks S1 and S2 are fluidly connected to a water tank T, which supplies water to a plant P, which may be located in a controlled medium enclosure 510, for example, a greenhouse, or in open air. The first container 306 can exchange salt water 310 with the first storage tank S1 while the second container 406 can exchange fresh water 410 with the second storage tank S2. Appropriate water pumps P1 and P2 may be mounted in the first and second containers 306 and 406, for transferring the water as needed. A controller system 520 may interact in a wired or wireless manner with these pumps for starting and stopping them. The control system 520 may be also connected to water level sensors 522, and/or temperature sensors 524, salinity sensors 526 for determining the level of water and salinity in each of the containers 306 and 406, and also for determining an ambient temperature of the plant P.

Water associated with the first evaporative pad 302 and the second evaporative pad 402 is naturally cooled to the wet bulb temperature of the incoming air stream 304 entering the module 400 because of the evaporation of water from the module. In this regard, note that it is possible that an air cooling system 460 is located upstream the salt water module 401, so that an incoming air stream AA, which may be ambient air, is first cooled by the air cooling system 460 to generate the air stream 304. In this way, the air stream 304 may have a temperature lower than a temperature of the salt water in the salt water module 401 and the fresh water in the fresh water module 403. The cooled water 410 can be used for irrigation of plants P in the indoor system 510, providing both water and a cool temperature for the roots of the plants P. Because the second evaporative pad 402 will also be collecting a small amount of remaining salt aerosols, as discussed in the embodiment of FIG. 4, it is likely that the salt content of this water 410 will increase over time. Depending upon the crops being irrigated and the rate of irrigation of these crops, the salt content of the cooled water 410 may increase above the tolerance limit of certain crops. However, the added salt may be a benefit for other crops, including halophytes (salt loving plants) and crops specifically managed for quality with salt water, including some types of tomatoes. Note that for especially salt tolerant halophytes, cool salt water 310 from the first evaporative pad 302 may also be used for irrigation.

In order to control which water goes to the irrigation tank T, a valve V1 is placed along the pipe connecting the first container 306 to the first storage tank S1 and another valve V2 is placed along the pipe connecting the second container 406 to the second storage tank S2. The control system 520 controls these two valves V1 and V2, and based on the salinity measurements received from salinity sensors 526, and the type of plants P that are irrigated with the water from the tank T, determines when to open or closed the first and second storage tanks S1 and S2. In one embodiment, it is possible to place a salinity sensor 526 in the irrigation tank T. Based on its readings, the control system 520 can also decide when to allow water 310 or water 410 or both to enter the irrigation tank T.

Figure 6:
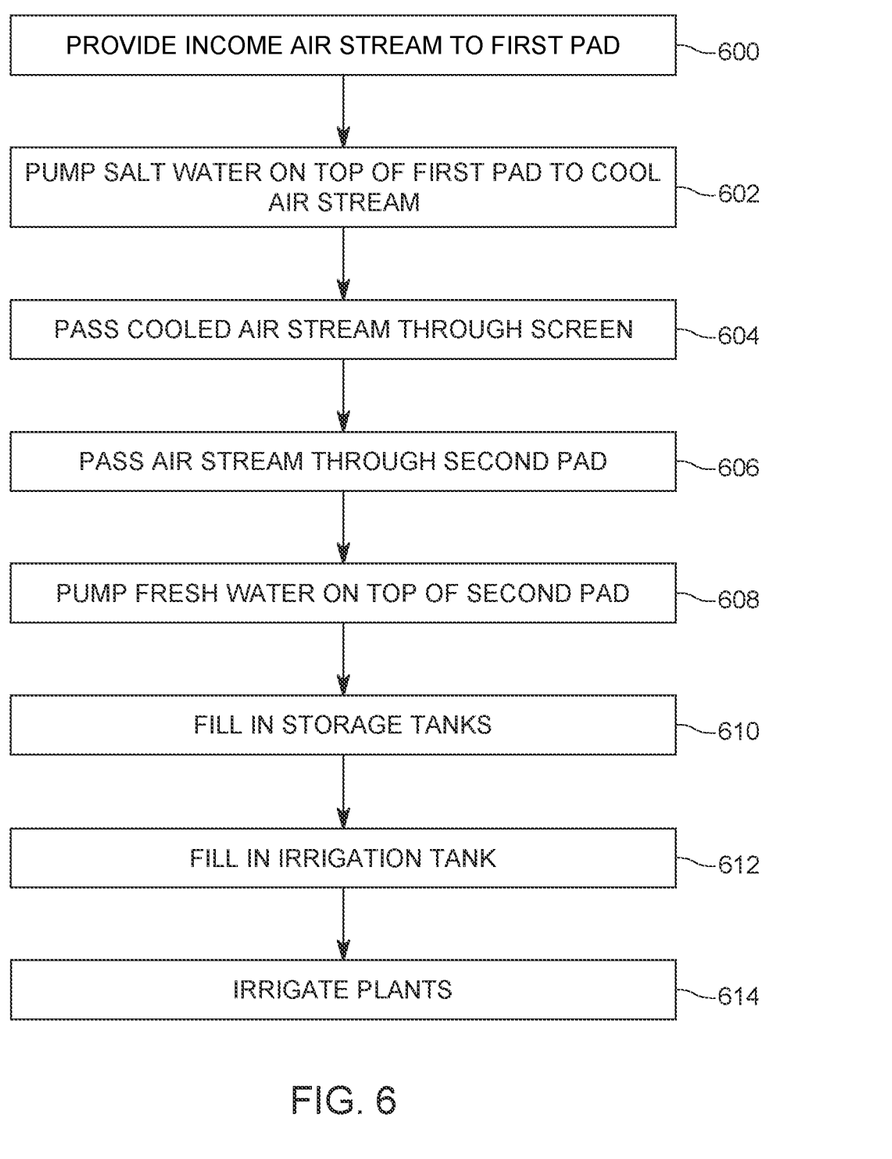
FIG. 6 is a flowchart of a method for directly cooling irrigation water.

A method for cooling irrigation water to be applied to crops is now discussed with regard to FIG. 6. In step 600, an incoming air stream 304 is moved through a first evaporative cooling pad 302. In step 602, a pump P1 forces the salt water 310 from a first container 306, in which a bottom end of the first evaporative cooling pad 302 may be placed (note that the pads may be placed to be in direct or indirect contact with the liquid), to a top end of the first evaporative cooling pad 302, to cool down the air stream 304. A cooled air stream 312, together with salt aerosols formed during this process, are then moving through a closed chamber 314. In step 604, the cooled air stream 312 and the salt aerosols pass a screen 316 of the chamber 314, which scrubs off the salt aerosols, thus forming a cooled and reduced salt aerosols air stream 312. Note that in step 602, part of the salt aerosols either fall due to the gravity into the first container 306, or are getting impacted on the screen 318.

The cooled and reduced salt aerosols air stream 312 enters in step 606 through a second evaporative cooling pad 402, for further scrubbing the salt aerosols. Fresh water 410 is pumped with a pump P2 in step 608, from a second container 406, to a top end of the second evaporative cooling pad 402. Note that the bottom end of the second evaporative cooling pad 402 is placed in the fresh water 410. The resulting air stream 412 is very low in salt aerosols and has a lower temperature than the incoming air stream 304. Also, the water in the first and second containers 306 and 406 is cooled during these processes. The control system 520 opens the valves V1 and V2 in step 610 to store the cooled water in respective storage tanks S1 and S2. In step 612, the control system 520 controls pumps P3 and P4 and valves V3 and V4 to allow only the cooled salt water 310, or only the cooled fresh water 410, or both of them to enter the irrigation tank T. An optional pump P5 may be used in step 614 to pump the water from the irrigation tank T to the enclosure 510 to irrigate the plants P.

The control system 520 may be configured to start the irrigation only when a temperature of the water in the irrigation tank T is below a certain temperature. In one application, it is possible that the control system 520 mixes the salt water 310 with the fresh water 410 in a certain ratio so that the amount of salt in the irrigation tank T is not higher than a certain limit that is acceptable for the plants P. In yet another application, the salt water 310 and the fresh water 410 in the first and second containers, respectively, may be refreshed from a corresponding source, not shown, for example, from the sea or ocean for the salt water and from a river, a well or the city supply for the fresh water.

Figure 7:
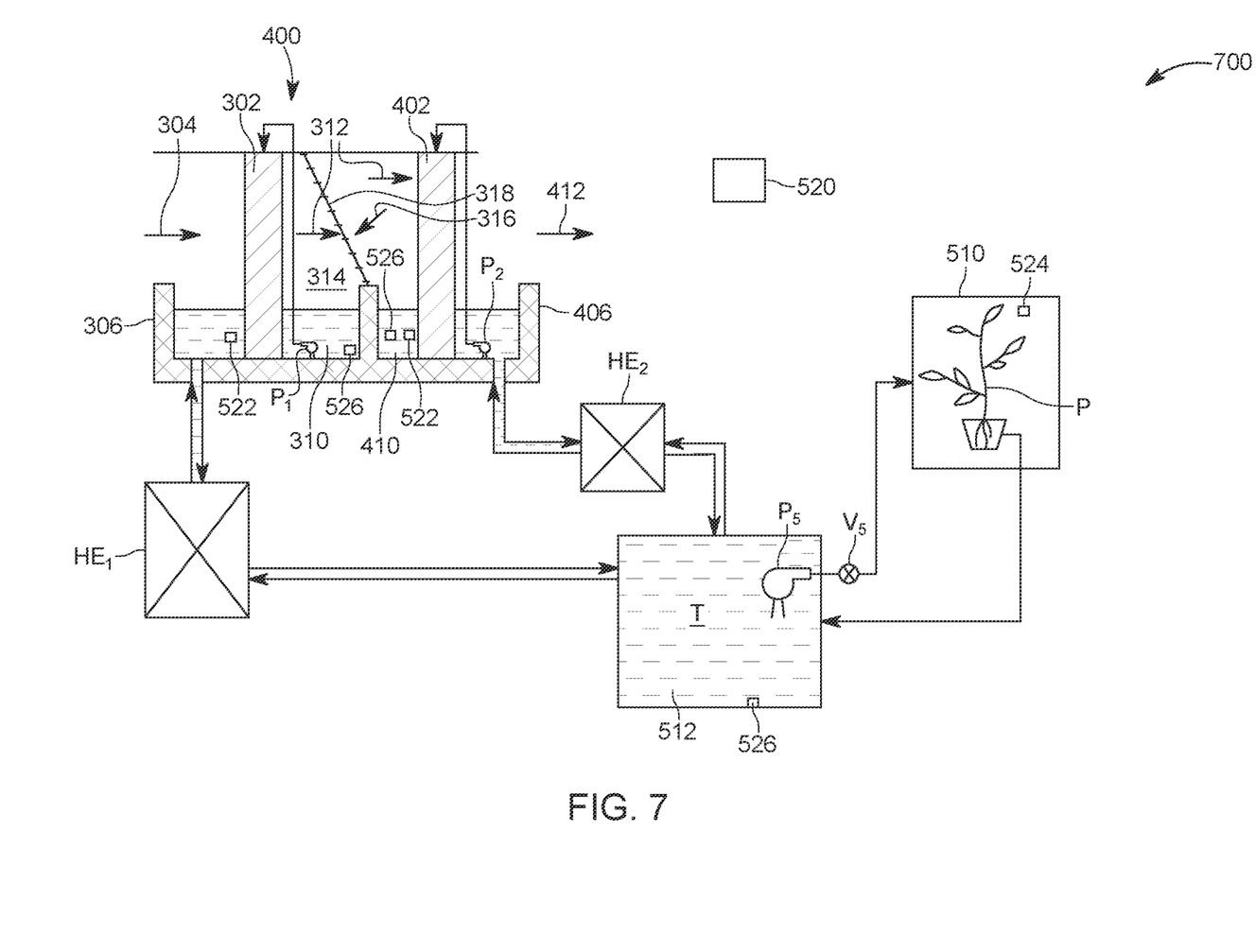
FIG. 7 shows a water cooling and salt aerosols removal system for indirectly cooling irrigation water.

An indirect irrigation water cooling and salt aerosols removal system 700 is now discussed with regard to FIG. 7, and it may include the salt aerosol removal module 400, an irrigation tank T, a first heat exchange unit HE1, and a second heat exchange unit HE2. The components and operation of the salt aerosol removal module 400 have been discussed above and they are not repeated herein. The first heat exchanger HE1 is thermally connected to the first container 306 and it uses the salt water 310 to cool the water 512 from the irrigation tank T. The second heat exchanger HE2 is thermally connected to the second container 406 and it uses the fresh water 410 to further cool the water 512 from the irrigation tank T. This means that the fresh water 512 from the irrigation tank T flows into each of the first and second heat exchangers HE1 and HE2, exchanges heat with the salt water 310 and the fresh water 410, but does not directly contact either of these two water sources. The cooled water 512 is then moved back to the irrigation tank T, and from there it may be pumped by pump P5 to the plants P. The salt aerosol removal module 400 may incorporated any of the four different mechanisms discussed with regard to FIGS. 1A to 4, or a combination of these mechanisms. In one application, it is possible that the salt aerosol removal module 400 includes all four technologies discussed above.

Thus, according to this embodiment, water from the first and second evaporative cooling pads, which will be cooled naturally to the wet bulb temperature of the incoming air 304, may also be used to cool the irrigation water via indirect cooling through a corresponding heat exchanger. In such a heat exchanger, the fresh or salt water from the evaporative coolers cools the irrigation water to be used in the indoor environment via indirect contact in the heat exchanger, i.e., it is not directly mixed into the irrigation water. This type of irrigation water cooling system is desirable when the crops that are grown are very salt sensitive or require a specific recipe of dissolved ions in the irrigation water for crop growth.

Figure 8:
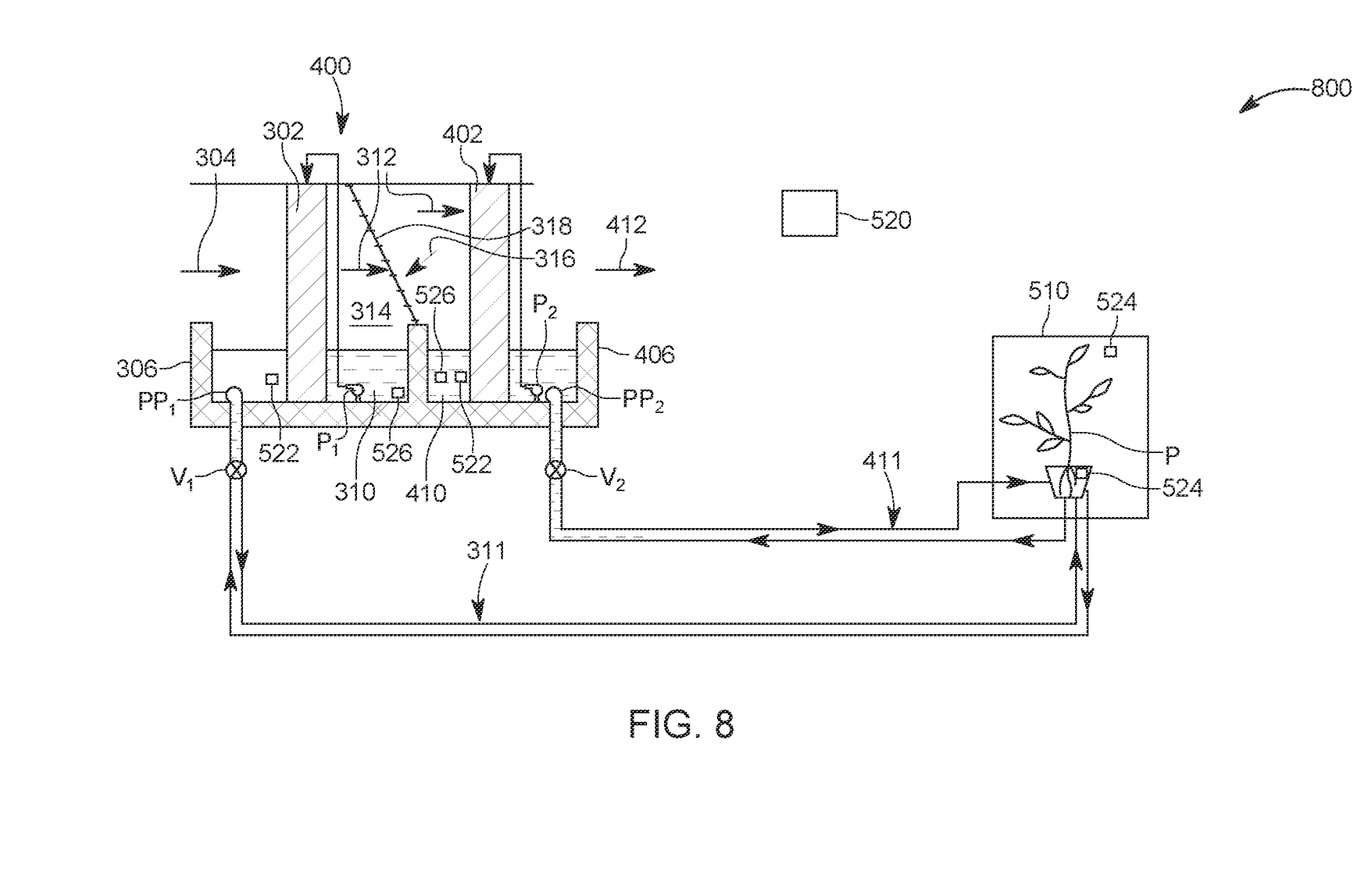
FIG. 8 shows a water cooling and salt aerosols removal system having piping sets for indirectly cooling the roots of a plant.

In another embodiment illustrated in FIG. 8, water from the first and second evaporative cooling pads, which is cooled naturally to the wet bulb temperature of the incoming air 304, may also be used to cool the root zone of the plant P via indirect cooling through a heat exchanger (typically a pipe or similar device in the root zone). In such a heat exchanger, the fresh or salt water from the evaporative coolers cools the root zone via indirect contact in a heat exchanger, but is does not directly contact the root zone.

In other words, as illustrated in FIG. 8, the salt aerosol removal module 400 is used to provide cooled water 310 and/or 410. This water is directly routed through piping 311 and 411, respectively, to the roots of the plant P, but at no time the water from these pipes is allowed to directly interact with the roots of the plant P or the soil in which the roots are located. Only a heat exchange takes place between the piping 311 and/or 411 and the roots of the plants or the soil in which the roots are located. For this reason this system is called an indirect root cooling system. The control system 520 controls the pumps PP1 and PP2, and associated valves V1 and V2, for achieving this heat exchange. The control system 520 opens and closes the valves V1 and V2 based on the readings from the temperature sensors 524 from each of the containers 306 and 406, and also based on a reading from a temperature sensor 524 that may be placed next to the roots of the plant P.

Figure 9:
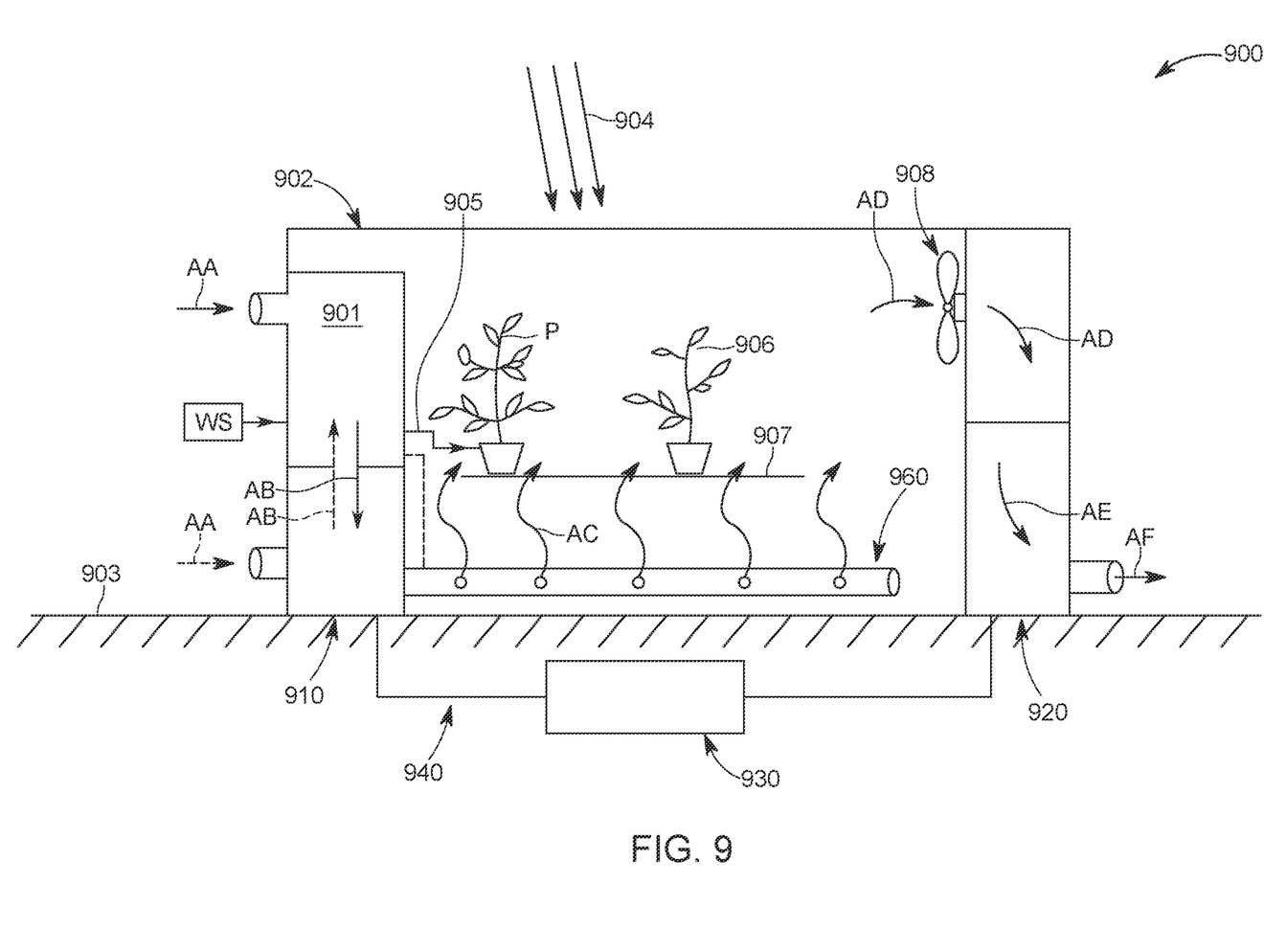
FIG. 9 shows a cooling system that has an air cooling system and a water cooling and salt aerosols removal system.

The systems 500, 700, and 800 discussed above may be integrated into a larger cooling system 900, as now discussed with regard to FIG. 9. Cooling system 900 includes at least a water cooling and salt aerosol removal system 901 (which can be any of the systems 400, 500, 700, or 800), which is located next to a closed enclosure 902 (e.g., a greenhouse in this embodiment, but the system works for any enclosure). In this regard, note that the water cooling and salt aerosol removal system 901 can include any and all elements shown in FIGS. 5, 7, and 8, even if FIG. 9 only generically shows system 901. This means, that system 901 may be implemented in FIG. 9 to have the storage tanks S1 and S2, and the irrigation tank T of FIG. 5, or to have the heat exchangers HE1 and HE2 and the irrigation tank T of FIG. 7, or the piping sets 311 and 411 of FIG. 8. However, because these components have been discussed in detail in those figures, these elements are not shown again in FIG. 9.

The cooling system 900 also includes an air cooling system 910 (which may be an evaporative cooler, a mechanical vapor compression cooler, liquid desiccant evaporative cooler system, or other cooling system), an optional liquid desiccant humidity recovery (LDHR) system 920, a storage system 930, a piping system 940 that connects the air cooling system 910, the LDHR system 920, and the storage system 930, and a control system 950, which controls each component of the system 900.

Ambient air AA is drawn from outside of the enclosure 902 into the cooling and salt aerosol system 901, where the salt aerosols are removed from the air stream, thus resulting into an air stream AB that has almost no salt aerosols. In the process, as previously discussed with regard to FIG. 4, the salt water in the first container 306 and the second container 406 of the system 901 is cooled and this may be used to cool, directly or indirectly, through piping 905, the irrigation water to be used for irrigating the plant P (any of the plant in the enclosure may benefit from this system) or the soil/air around the roots of the plant P.

The air stream AB, which is stripped of the salt aerosols based on one or more of the embodiments illustrated in FIGS. 1A to 4, is now provided to the air cooling system 910 and cooled inside the air cooling system 910 and then released inside the enclosure 902 as air stream AC, for lowering the temperature of the enclosure during the day, when the solar waves (energy) 904 entering the enclosure is at maximum. Because of the salt aerosol removal system 901, almost no salt aerosol is now entering inside the enclosure 902, which helps in preventing the rusting of the structure of the enclosure.

In one application, the air stream AC is released through a discharge mechanism 960 over a large area of the enclosure 902. In one application, the discharge mechanism 960 may include various piping having corresponding holes and the piping is distributed under the bed 907 of plants 906, for releasing the air stream AC uniformly over the entire floor of the enclosure 902. Various plants 906 present inside the enclosure 902 interact with the air stream AC and release part of their humidity, which results in a high-humidity, warm air stream AD. The high-humidity, warm air stream AD is absorbed into the LDHR system 920. For this purpose, it is possible to use one or more fans 908 to move the various air streams in, out and through the enclosure 902.

Although FIG. 9 shows and the above paragraphs describe that the outside air stream AA enters first the water cooling and salt aerosol removal system 901 and then the air cooling system 910, it is possible that the air stream AA enters first the air cooling system 910 for cooling it, and then the cooled air stream AB is supplied to the water cooling and salt aerosol removal system 901 for removing the salt aerosols. In this way, the cooled air stream from the air cooling system 910 is used to cool down the salt water 310 and the fresh water 410 from the salt water module 401 and the fresh water module 403.

The LDHR system 920 removes the humidity from the high-humidity, warm air stream AD and transforms it into a low-humidity air stream AE, which may be discharged outside the enclosure 902 as air stream AF. The desiccant used in both the air cooling system 910 and the LDHR system 920 is exchanged with the storage system 930 when the vapor pressure of the desiccant is smaller or larger than the vapor pressure of the corresponding air stream so that the low- or high-humidity desiccant is used by each system. The storage system 930 is preferable located underground, i.e., below the Earth's surface 903. However, it is possible to locate the storage system 930 above ground. In one application, the storage system 930 is located underneath the enclosure 902 for reducing the length of the piping system 940 and also for reducing the footprint of the system.

Figure 10:
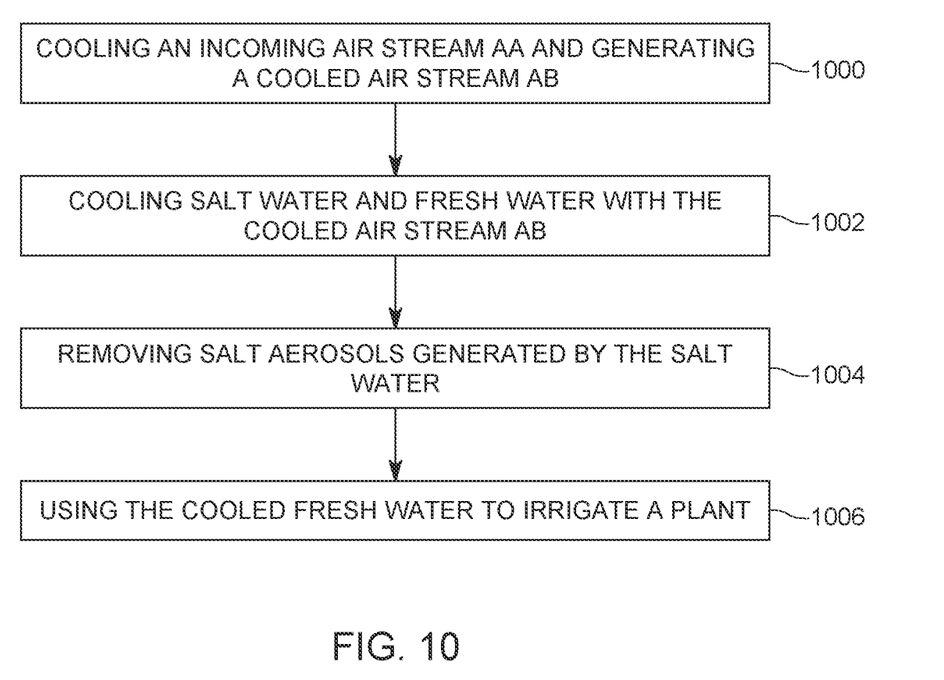
FIG. 10 is a flowchart of a method for cooling irrigation water with a water cooling and salt aerosols removal system.

A method for cooling water and removing salt aerosols using the system 900 is now discussed with regard to FIG. 10. FIG. 10 is a flowchart that includes a step 1000 of cooling an incoming air stream AA and generating a cooled air stream AB, a step 1002 of cooling salt water 310 and fresh water 410 with the cooled air stream AB, a step 1004 of removing salt aerosols generated by the salt water, and a step 1006 of using the cooled fresh water 410 to irrigate a plant. The method may also include a step of directing the cooled air stream through a screen to remove a first part of the salt aerosols and through an evaporative pad that is maintained wet with the fresh water to remove a second part of the salt aerosols.

The disclosed embodiments provide a water cooling and salt aerosols removal system. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Fazlil Ilahi, W. F., Ahmad, D., and Husain, M. C. (2017). Effects of root zone cooling on butterhead lettuce grown in tropical conditions in a coir-perlite mixture. Horticulture, Environment, and Biotechnology 58, 1-4.

Junge, C. E., and Gustafson, P. E. (1957). On the Distribution of Sea Salt over the United States and its Removal by Precipitation. Tellus 9, 164-173.

Lefers, R., Bettahalli, N. M. S., Nunes, S. P., Fedoroff, N., Davies, P. A., and Leiknes, T. (2016). Liquid desiccant dehumidification and regeneration process to meet cooling and freshwater needs of desert greenhouses. Desalination and Water Treatment 57, 23430-23442.

Lertsatitthanakorn, C., Rerngwongwitaya, S., and Soponronnarit, S. (2006). Field experiments and economic evaluation of an evaporative cooling system in a silkworm rearing house. Biosystems engineering 93, 213-219.

Malli, A., Seyf, H. R., Layeghi, M., Sharifian, S., and Behravesh, H. (2011). Investigating the performance of cellulosic evaporative cooling pads. Energy Conversion and Management 52, 2598-2603.

Paton, C., and Davies, P. (1996). The Seawater Greenhouse for Arid Lands. Paper presented at: Mediterranean Conference on Renewable Energy Sources for Water Production (Santorini, Greece).

What is claimed is:

1. A water cooling and salt aerosols removal system for cooling roots of a plant, the system comprising:
a salt water module configured to cool a salt water and to remove salt aerosols from an air stream by passing the air stream (1) through a first evaporative pad into a closed chamber, where the first evaporative pad is wetted from above with the salt water, and (2) through a filter that forms the closed chamber with the first evaporative pad; and
a fresh water module configured to further remove salt aerosols from the air stream by a second evaporative pad that is wetted from above with fresh water,
wherein the air stream exits the salt water module and enters the fresh water module before being used for the plant, and
wherein the salt water has a higher content of salt than the fresh water.

2. The system of claim 1, wherein the salt water module includes the first evaporative pad that has one end placed into the salt water and the salt water is held by a first container.

3. The system of claim 2, wherein the salt water module includes the closed chamber defined by the first evaporative pad, a surface of the salt water, and a wall that has the filter.

4. The system of claim 3, wherein the filter has pores that allow the air stream to pass, but not the salt aerosols.

5. The system of claim 3, wherein the fresh water module includes the second evaporative pad through which the air stream passes.

6. The system of claim 5, wherein the fresh water module includes a second container that holds the fresh water, the second evaporative pad has a bottom end inside the fresh water, and the fresh water is pumped to a top of the second evaporative pad to capture the salt aerosols from the air stream.

7. The system of claim 1, further comprising:
a first storage tank S1 fluidly communicating with the salt water module to receive cooled salt water; and
a second storage tank S2 fluidly communicating with the fresh water module to receive cooled fresh water.

8. The system of claim 7, further comprising:
an irrigation tank that fluidly communicates with the first and second storage tanks; and
a control system that controls an amount of salt water and an amount of fresh water that moves from the salt water module and the fresh water module to the irrigation tank.

9. The system of claim 8, wherein the control system turns on a pump associated with the irrigation tank to pump a water in the irrigation tank to a plant.

10. The system of claim 1, further comprising:
a first heat exchange module fluidly connected to the salt water module;
a second heat exchange module fluidly connected to the fresh water module; and
an irrigation tank that holds irrigation water in fluid communication with the first and second heat exchange modules,
wherein the first heat exchange module transfers heat from the irrigation water to the salt water and the second heat exchange module transfers heat from the irrigation water to the fresh water.

11. The system of claim 10, further comprising:
a control system that turns on a pump associated with the irrigation tank to pump a water in the irrigation tank to a plant.

12. The system of claim 1, further comprising:
a first set of piping fluidly connected to the salt water of the salt water module; and
a second set of piping fluidly connected to the fresh water of the fresh water module,
wherein the first and second sets of piping extend to roots of a plant to cool the roots.

13. An air cooling and salt aerosols removing system comprising:
an air cooling system configured to cool an incoming air stream AA and generate a cooled air stream AB;
a water cooling and salt aerosols removing system configured to receive the cooled air stream AB, cool water stored by the water cooling and salt aerosols removing system and remove salt aerosols from the cooled air stream AB, wherein the water cooling and salt aerosols removing system includes,
a salt water module configured to remove salt aerosols from the air stream AB by passing the air stream AB (1) through a first evaporative pad into a closed chamber, where the first evaporative pad is wetted from above with the salt water, and (2) through a filter that forms the closed chamber with the first evaporative pad, and
a fresh water module configured to further remove salt aerosols from the air stream AB by a second evaporative pad that is wetted from above with fresh water; and
a piping system connected to the water cooling and salt aerosols removing system, and configured to discharge the cooled air stream AB into an enclosure and the cooled water to roots of a plant in the enclosure.

14. The system of claim 13, wherein
the cooled air stream AB exits the salt water module and enters the fresh water module before being used for the plant, and
wherein the salt water has a higher content of salt than the fresh water.

15. The system of claim 14, wherein the salt water module includes the first evaporative pad that has one end placed into the salt water and the salt water is held by a first container.

16. The system of claim 15, wherein the salt water module includes the chamber defined by the first evaporative pad, a surface of the salt water, and a wall that has a filter.

17. The system of claim 16, wherein the fresh water module includes a second evaporative pad through which the cooled air stream passes.

18. The system of claim 17, wherein the fresh water module includes a second container that holds the fresh water, the second evaporative pad has a bottom end inside the fresh water, and the fresh water is pumped to a top of the second evaporative pad to capture the salt aerosols from the air stream.

19. A method for cooling water and removing salt aerosols comprising:
cooling an incoming air stream AA with an air cooling system and generating a cooled air stream AB;
cooling salt water with a salt water module and fresh water with a fresh water module based on the cooled air stream AB;
removing salt aerosols generated by the salt water in each of the salt water module and the fresh water module, with a filter in the salt water module and with an evaporative pad in the fresh water module; and using the cooled fresh water to irrigate a plant.

20. The method of claim 19, wherein the step of removing comprises:

directing the cooled air stream through the filter of a screen to remove a first part of the salt aerosols and through the evaporative pad that is maintained wet with the fresh water to remove a second part of the salt aerosols.

* * * * *